(12) United States Patent
Di Palma et al.

(10) Patent No.: US 8,727,388 B2
(45) Date of Patent: May 20, 2014

(54) COUPLING ARRANGEMENT COMPRISING A COUPLING BODY AND A METAL PIPE, AS WELL AS METHOD FOR ASSEMBLY OF THE COUPLING BODY

(75) Inventors: Michele Di Palma, Springe (DE); Stephan Lange, Wedemark (DE); Klaus Schippl, Hannover (DE); Christian Frohne, Hannover (DE)

(73) Assignee: Nexans, Paris (FR)

( * ) Notice: Subject to any disclaimer, the term of this patent is extended or adjusted under 35 U.S.C. 154(b) by 131 days.

(21) Appl. No.: 13/278,265

(22) Filed: Oct. 21, 2011

(65) Prior Publication Data
US 2012/0153611 A1 Jun. 21, 2012

(30) Foreign Application Priority Data
Dec. 21, 2010 (EP) .................................. 10306467

(51) Int. Cl.
*F16L 15/00* (2006.01)

(52) U.S. Cl.
USPC ....................................... 285/390; 285/288.1

(58) Field of Classification Search
USPC ........... 285/289.1–289.5, 903, 288.1–288.11, 285/390; 29/456; 228/170
See application file for complete search history.

(56) References Cited

U.S. PATENT DOCUMENTS 3,008,737 A * 11/1961 Longfellow ............... 285/289.1
3,757,280 A 9/1973 Staschewski
4,227,639 A * 10/1980 Blumenberg .............. 228/173.4

FOREIGN PATENT DOCUMENTS

FR 2241741 3/1975

* cited by examiner

*Primary Examiner* — Aaron Dunwoody
(74) *Attorney, Agent, or Firm* — Sofer & Haroun, LLP

(57) ABSTRACT

A coupling arrangement has a coupling body and a helically shaped undulated metal pipe which has an end face extending along a screw thread of its undulation. A metal holding ring is mounted on the connecting part resting against the latter, where the outer diameter of the holding ring corresponds approximately to the outer diameter of the pipe, where the end face of the holding ring facing the pipe extends along a screw thread corresponding to the screw thread of the pipe, and where the holding ring is connected in the mounted position, fixedly to the connecting part by resting fixedly and tightly against the end face of the pipe.

8 Claims, 1 Drawing Sheet

COUPLING ARRANGEMENT COMPRISING A COUPLING BODY AND A METAL PIPE, AS WELL AS METHOD FOR ASSEMBLY OF THE COUPLING BODY

RELATED APPLICATION

This application claims the benefit of priority from European Patent Application No. 10 306 467.1, filed on Dec. 21, 2010, the entirety of which is incorporated by reference.

BACKGROUND

1. Field of the Invention

The invention relates to a coupling arrangement comprising a coupling body and a metal pipe which is helically corrugated and which has an end face extending along a screw thread of its corrugation, as well as to a method for the assembly of the coupling body.

2. Description of Related Art

A corresponding coupling arrangement is disclosed, for example, FR 2 241 741 A1.

Metal pipes which are corrugated transversely of their longitudinal direction have been known for a long time. They are used, for example, as electrical conductors of high frequency cables, as sheathing for electrical and optical cables, in cryostats for superconductive cables, or for conveying liquid or gaseous media. Because of the corrugation of the pipe, special connections are required for its further connection. In pipes which are helically corrugated, such connections are still of relatively simple construction. In helically shaped corrugated pipes, this is more difficult because in a radial section through such a pipe additionally an end face is created which is located eccentrically relative to the middle axis of the pipe and which may possibly be non-round.

In the known coupling arrangement according to DE-C-21 26 871, a holding ring is screwed onto the end of a helically corrugated pipe, wherein the holding ring rests in the assembled position against a radially outwardly bent crimped edge of the pipe. Placed on the holding ring is a fitting which has a contact surface corresponding to a screw thread of the pipe or to the shape of the crimped edge, wherein in the mounted position the coupling body rests against the crimped edge. This coupling body is complicated and not suitable for a stable connection of further structural components. Moreover, the coupling body projects in the radial direction far beyond the pipe, so that it cannot be used particularly in spatially tight assembly locations.

FR 2 241 741 A1 discloses a coupling arrangement between a flexible helically corrugated metal pipe and a rigid pipe piece. The pipe piece is at one of its ends provided with a corrugation which corresponds with a slightly smaller dimension to the corrugation of the pipe. In the mounted position, the pipe piece with the area of the corrugation is screwed into the pipe. For example, both parts are fixedly connected to each other by soldering.

OBJECTS AND SUMMARY

The invention is based on the object of configuring the above described coupling arrangement in such a way that the coupling body can be mounted with a stable fixed seat on a helically corrugated pipe and does not protrude in the radial direction beyond the dimensions of the pipe.

In accordance with the invention, the following method steps are carried out for the assembly of the coupling body.

a) The pipe is cut open at one end along a screw thread in the axial direction by a means of a cut in the axial direction which connects the beginning and the end of the screw thread after one rotation;

b) A metal pipe piece provided with an corrugation is screwed into the pipe, wherein the pipe piece has a fastening part provided with at its outer circumferential surface a helically shaped contour and a smooth cylindrical connecting part which protrudes in the mounted position out of the pipe;

c) A metal holding ring is slid onto the connecting part, wherein the connecting part has an end face corresponding to a screw thread of the pipe and extending along a helical line;

d) A metal sleeve is fastened to the end of the connecting part;

e) By means of pressure elements which are arranged between the holding ring and the sleeve, the holding ring is pressed with its helically extending end face against the end face of the pipe and is in this position tightly connected to the connecting part of the pipe piece.

The pipe piece of the coupling body of this coupling arrangement is screwed with its fastening part into the helically corrugated pipe. Accordingly, it is located within the pipe and, therefore, does not protrude in the radial direction beyond the latter. This is also true for its connecting part which in the mounted position protrudes in the axial direction out of the pipe, for connecting further structural components, and for the holding ring whose outer diameter corresponds approximately to the outer diameter of the pipe. Advantageously, the outer diameter of the holding ring is slightly smaller than the outer diameter of the pipe. In addition, the fastening part of the pipe piece is additionally fastened in the pipe by means of the holding ring in a stable position in the pipe, wherein the holding ring rests circumferentially and tightly against the end face of the pipe. The holding ring, which during its mounting and prior to being fastened to the connecting part, presses by means of the pressure elements against the end face of the pipe, additionally the sides of the thread of the fastening part are pressed against the wall of the corresponding corrugation of the pipe, whereby the tight seat of the fastening part in the pipe is reinforced.

Particularly advantageously, the corrugated pipe is cut at its end in the area of the apex of an outwardly facing wave crest extending as a smooth thread with a cut in the axial direction bridging the incline of the screw thread. This results for the end face of the pipe in a large contact surface area for the holding ring. The area is the largest when the pipe is cut exactly along the apex of a wave crest.

BRIEF DESCRIPTION OF THE DRAWINGS

An embodiment of the subject matter of the invention is illustrated in the drawings.

In the drawing.

DETAILED DESCRIPTION

Figure 1:
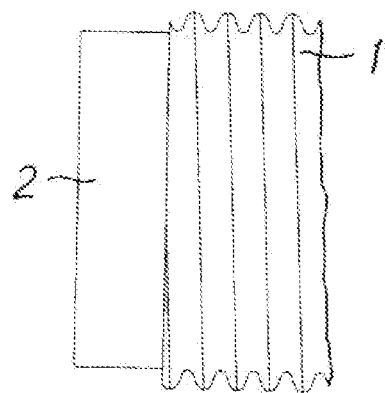
FIG. 1 shows in a schematic view the end of a helically corrugated metal pipe with a coupling body attached thereto.

In FIG. 1, the end of a metal pipe 1 is illustrated which is provided with a corrugation extending transversely of its axis along a helical line. Pipe 1 consists advantageously of steel, particularly high-grade steel, or copper. A coupling body 2 is fastened in or on the pipe 1; the coupling body 2 serves for connecting further structural components. The coupling body 2 has a cylindrical circumferential surface and, at its end protruding out of the pipe 1, an end face extending at a right angle relative to its axis.

Figure 2:
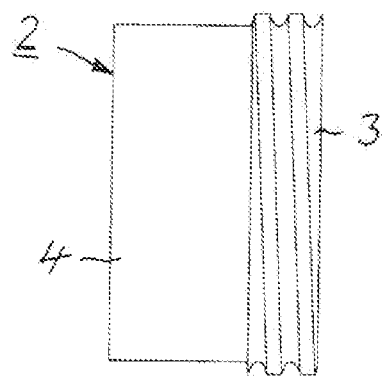
FIG. 2 is a side view of the coupling body used in the coupling arrangement according to the invention.

The coupling body 2 is composed of metal, particularly of high-grade steel. It is constructed as a pipe piece and, in accordance with FIG. 2, has at its one axial end a fastening part 3 provided with an external thread. The external thread thereof corresponds to the helical shape of the corrugation of the pipe 1. On the side facing away from the fastening part 3, the pipe piece of the coupling body 2 has a smooth cylindrical connecting part 4. When the coupling body 2 is screwed into the pipe 1 in the mounted state, a metal sleeve 5 is fastened to the end of the connecting part 4, for example, by welding, or soldering.

The coupling body 2 is mounted on or in the end of pipe 1, for example, as follows:

The pipe 1 is cut at its end in the area of the apex of an outwardly directed wave crest, so that an end face which is circular in the top view and extends along a screw thread is obtained as a contact surface for a corresponding part of the coupling body 2. Advantageously, the cut is performed precisely in the apex of the wave crest. The contact surface of the end face then has a maximum size.

Subsequently, the pipe piece of the coupling body 2 is screwed with its fastening part 3 into the pipe 1 to such an extent that all its helically extending projections 6 according to 3 engage in the corrugation of the pipe 1. Consequently, the connecting part 4 of the pipe piece rests against the inwardly directed wave valleys of the pipe 1 over a short axial length. However, the predominant length of the connecting part 4 protrudes in the axial direction out of the pipe 1.

Figure 3:
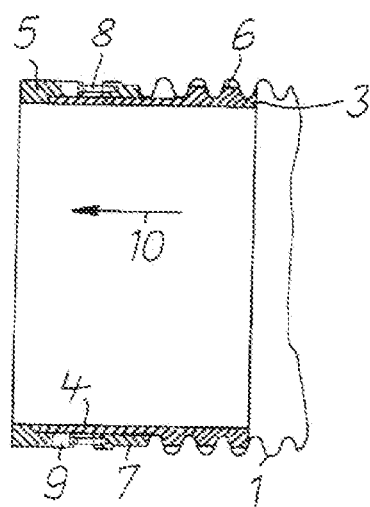
FIG. 3 is a cross-sectional view of the pipe according to FIG. 1 equipped with the coupling body.

When the pipe piece of the coupling body 2 has reached its predetermined position in the pipe 1, as it is illustrated, for example, in FIG. 3, a metal holding ring 7 is slid onto the connecting part 4, wherein the holding ring 7 has on the side intended for contact with the pipe 1 a helically extending end face corresponding to the configuration of the end face of the pipe 1. Advantageously, the holding ring 7 is pushed onto the connecting part 4 until it contacts the end face of the pipe 1. Subsequently, the metal sleeve 5 is placed onto the end of the connecting part 4 and is preferably fixedly connected thereto, for example, by welding or soldering.

Subsequently, pressure elements extending and acting in the axial direction are mounted between the holding ring 7 and the sleeve 5, specifically distributed over the circumference of the connecting part 4. Suitable pressure elements are, for example, screws 8 which with their heads rest against the sleeve 5 or, according to the illustration in FIG. 3, against spacer pieces 9. The screws 8 are screwed into threaded holes of the holding ring 7. When the screws 8 are further turned, the holding ring 7 is pressed against the end face of the pipe 1, specifically until a desired contact pressure force has been reached. In this position the holding ring 7 is fixedly connected to the connecting part 4, preferably be welding or soldering.

When the support ring 7 is pressed against the end face of the pipe 1, a load is supplied simultaneously against the pipe piece as a whole in the axial direction because the screws 8 rest against the spacer pieces 9 and, thus, against the sleeve 5. As a result, the sides of the thread of the fastening part 3 of the pipe piece formed by the projections 6 are pressed in the direction of the arrow 10 against the wall of the corresponding corrugation of the pipe 1. As a result, additionally a fixed seat is also achieved between the pipe piece 3 and the pipe 1.

The holding ring 7 can advantageously in its end position also be welded or soldered to the pipe 1, so that a fixed and tight connection between the two parts is produced.

Since the screws 8 are no longer required in the finally mounted coupling body 2, they can subsequently be removed. For this purpose initially the spacer pieces 9 are taken out to provide room for screws 8. Subsequently, the screws 8 are turned back until they are no longer in engagement in the threaded holes of the holding ring 7. They can then be removed without problems.

The invention claimed is:

1. Coupling arrangement comprising:
   a helically shaped corrugated metal pipe cut at its end along a screw thread so that an end face extending along the screw thread of the corrugations of said corrugated metal pipe is obtained; and
   a coupling body for attachment to said metal pipe, said coupling body having a fastening part having metal which has a helically shaped contour extending in an axial direction of the pipe and corresponding to the screw thread of the corrugation of the pipe,
   wherein, in the mounted position, said fastening part of said coupling body rests against the pipe by engaging in the corrugation of the pipe,
   wherein said coupling body has a connecting part integrally connected with the fastening part, wherein the outer diameter of the connecting part is cylindrically shaped and has a smooth outer circumferential surface that corresponds to the inner diameter of the pipe,
   wherein the connecting part protrudes in the mounted position in an axial direction out of the pipe, and
   wherein a metal holding ring is mounted on and rests against the connecting part, wherein the outer diameter of the holding ring corresponds approximately to an outer diameter of the pipe, where an end face of the holding ring facing the pipe extends along a screw thread corresponding to the screw thread of the pipe, and where the holding ring is connected in the mounted position, fixedly to the connecting part by resting fixedly and tightly against the end face of the pipe.

2. Coupling arrangement according to claim 1, wherein, for forming the end face extending along a screw thread of the corrugation, the pipe is cut in the area of the apex of an outwardly directed wave crest with a configuration corresponding to the screw thread.

3. Coupling arrangement according to claim 1, wherein the holding ring is fixedly connected to the pipe.

4. Coupling arrangement according to claim 1, wherein a metal sleeve is fastened on the outside of the end of the connecting part which in the mounted position protrudes out of the pipe, wherein the outer diameter of the sleeve corresponds to the outer diameter of the pipe.

5. Method of fastening a coupling body to the end of a helically corrugated pipe, said method comprising the steps of:
   a) a pipe is cut open at one end along a screw thread in the axial direction by means of a cut in the axial direction which connects the beginning and the end of the screw thread after one rotation;
   b) a metal pipe piece provided with a corrugation is screwed into the pipe, wherein the pipe piece has a fastening part provided at its outer circumferential surface a helically shaped contour and a smooth cylindrical connecting part which protrudes in the mounted position out of the pipe;
   c) a metal holding ring is slid onto the connecting part, wherein the connecting part has an end face corresponding to a screw thread of the pipe and extending along a helical line;

d) a metal sleeve is fastened to the end of the connecting part; and
e) by means of pressure elements which are arranged between the holding ring and the sleeve, the holding ring is pressed with its helically extending end face against the end face of the pipe and is in this position tightly connected to the connecting part of the pipe piece.

6. Method according to claim 5, wherein the holding ring is welded or soldered to the connecting part of the pipe piece.

7. Method according to claim 5, wherein the holding ring is welded or soldered to the pipe.

8. Method according to claim 5, wherein the metal sleeve is welded or soldered to the connecting part of the pipe piece.

* * * * *